US007809993B2

(12) United States Patent
Bolan et al.

(10) Patent No.: US 7,809,993 B2
(45) Date of Patent: Oct. 5, 2010

(54) APPARATUS, SYSTEM, AND METHOD FOR RECEIVING DIGITAL INSTRUCTIONS AT DEVICES SHARING AN IDENTITY

(75) Inventors: Joseph Edward Bolan, Cary, NC (US); Darren Christopher Douglas, Tucson, AZ (US); Jason James Graves, Tucson, AZ (US); Shah Mohammad Rezaul Islam, Tucson, AZ (US); Lei Liu, Tucson, AZ (US); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 11/333,137

(22) Filed: Jan. 17, 2006

(65) Prior Publication Data

US 2007/0168441 A1    Jul. 19, 2007

(51) Int. Cl.
 *G06F 11/00* (2006.01)
(52) U.S. Cl. ...................................................... 714/48
(58) Field of Classification Search .................. 714/48, 714/3; 710/240, 200
See application file for complete search history.

(56) References Cited

U.S. PATENT DOCUMENTS

| | | | | |
|---|---|---|---|---|
| 4,503,534 A * | 3/1985 | Budde et al. | ............... | 714/54 |
| 4,642,630 A * | 2/1987 | Beckner et al. | ............ | 710/240 |
| 5,222,062 A * | 6/1993 | Sharma et al. | ............. | 370/218 |
| 5,367,647 A * | 11/1994 | Coulson et al. | ............ | 710/105 |
| 5,388,224 A * | 2/1995 | Maskas | ..................... | 710/104 |
| 5,459,840 A * | 10/1995 | Isfeld et al. | ............... | 710/240 |
| 5,619,726 A * | 4/1997 | Seconi et al. | ................ | 710/22 |
| 5,790,775 A * | 8/1998 | Marks et al. | .................. | 714/9 |
| 5,790,895 A * | 8/1998 | Krontz et al. | ................ | 710/64 |
| 5,862,353 A * | 1/1999 | Revilla et al. | ............... | 710/107 |
| 5,887,194 A * | 3/1999 | Carson et al. | ................. | 710/36 |
| 5,900,015 A * | 5/1999 | Herger et al. | ............... | 711/141 |
| 5,935,230 A * | 8/1999 | Pinai et al. | .................. | 710/111 |
| 6,038,624 A * | 3/2000 | Chan et al. | .................. | 710/302 |
| 6,493,771 B1 * | 12/2002 | Fong | .......................... | 710/15 |
| 6,513,082 B1 * | 1/2003 | Fischer et al. | ............... | 710/113 |
| 6,601,128 B1 | 7/2003 | Burton et al. | ............... | 710/316 |

(Continued)

OTHER PUBLICATIONS

Burton, Morton, "Method, System, and Program for Updating Firmware to a Storage System Comprised of Multiple Controllers", IBM Disclosure TUC8-2005-0026.

*Primary Examiner*—Robert Beausoliel
*Assistant Examiner*—Amine Riad
(74) *Attorney, Agent, or Firm*—Kunzler Needham Massey & Thorpe

(57) ABSTRACT

An apparatus, system, and method are disclosed for receiving digital instructions at devices or controllers sharing an identity. A first controller receives a digital instruction instance over a communications medium. The digital instruction instance may be a firmware instance. The first controller has ownership of the communications medium and shares the communications medium and a common identity with a second controller. An ownership module transfers ownership of the communications medium from the first controller to the second controller. The ownership module may transfer ownership in response to the first controller successfully receiving the digital instruction instance. A request module requests a retransmission of the digital instruction instance, and may request the retransmission in response to the transfer of ownership of the communications medium. The second controller receives the retransmitted digital instruction instance in response to the retransmission request.

18 Claims, 7 Drawing Sheets

U.S. PATENT DOCUMENTS

| | | |
|---|---|---|
| 6,675,258 B1 | 1/2004 | Bramhall et al. ............ 711/114 |
| 6,704,819 B1 * | 3/2004 | Chrysanthakopoulos .... 710/240 |
| 6,708,246 B1 * | 3/2004 | Ishihara et al. ............. 710/309 |
| 6,985,985 B2 * | 1/2006 | Moss ......................... 710/240 |
| 2003/0097607 A1 * | 5/2003 | Bessire .......................... 714/5 |
| 2003/0145130 A1 | 7/2003 | Schultz et al. .............. 709/325 |
| 2003/0188051 A1 | 10/2003 | Hawkins et al. ............... 710/15 |
| 2004/0024917 A1 | 2/2004 | Kennedy et al. ............... 710/1 |
| 2004/0068548 A1 | 4/2004 | Sugita ........................ 709/208 |
| 2004/0100969 A1 * | 5/2004 | Sankar et al. .......... 370/395.31 |
| 2005/0076107 A1 | 4/2005 | Goud et al. ................. 709/223 |
| 2005/0207105 A1 * | 9/2005 | Davies ....................... 361/683 |

* cited by examiner

APPARATUS, SYSTEM, AND METHOD FOR RECEIVING DIGITAL INSTRUCTIONS AT DEVICES SHARING AN IDENTITY

BACKGROUND OF THE INVENTION

1. Field of the Invention

This invention relates to receiving digital instructions and more particularly relates to receiving digital instructions at multiple devices each sharing a common identity.

2. Description of the Related Art

Digital systems such as data processing systems, control systems, and communication systems frequently employ controllers to manage local functions. For example, an automotive control system may use a controller to manage carburetor functions or a blade center may use a controller to manage each blade in the blade center.

The digital system may include a service module. The service module is configured to communicate with one or more controllers. For example, a service module in a blade center may direct a controller in a blade to perform a maintenance function such rebooting the blade by issuing a command over a communication medium such as a digital bus. The controller may perform a function by executing digital instructions. The digital instructions may be configured as firmware and comprise one or more software processes.

The service module may transmit the digital instructions to the controller each time the controller starts operation, such as during a power-up, reboot, or similar procedures wherein the controller begins operation from an initial state. For example, the service module may communicate an instance of digital instructions over the communications medium. The controller receives the digital instruction instance from the service module, stores the digital instruction instance in a volatile memory, and executes instructions from the digital instruction instance.

Alternatively, the controller may store an instance of the digital instructions in a non-volatile memory and use the stored digital instruction instance each time the controller starts operation. The service module may periodically communicate an updated digital instruction instance to the controller, wherein the controller stores the updated digital instruction instance in the non-volatile memory.

A digital system may employ multiple redundant controllers for one or more controller functions to eliminate single point failures relating to the controller functions. For example, a blade may include a first and a second controller. Both the first and second controllers are configured to perform substantially equivalent functions, but only the first controller may perform the functions. If the first controller fails, then the second controller may perform the functions.

Unfortunately, in order for the first and second controller to perform redundant functions, the first and second controllers may share an identity for communications with the service module over the communications medium. For example, the first and second controllers may share a common address. In addition, the service controller may be unable to distinguish between the first and second controllers. As a result, the service module is unable to transmit a digital instruction instance to the first controller, receive confirmation that the first controller received the digital instruction instance, and then communicate the digital instruction instance to the second controller and receive confirmation that the second controller received the digital instruction instance.

From the foregoing discussion, it should be apparent that a need exists for an apparatus, system, and method that transmit digital instructions to devices or controllers that share a common identity. Beneficially, such an apparatus, system, and method would transmit digital instructions separately to a plurality of controllers and verify that each controller received the digital instructions.

SUMMARY OF THE INVENTION

The present invention has been developed in response to the present state of the art, and in particular, in response to the problems and needs in the art that have not yet been fully solved by currently available digital instruction receiving methods. Accordingly, the present invention has been developed to provide an apparatus, system, and method for receiving digital instructions that overcome many or all of the above-discussed shortcomings in the art.

The apparatus to receive digital instructions is provided with a plurality of modules configured to functionally execute the steps of receiving a digital instruction instance over a communications medium at a first communications module, transferring ownership of the communications medium to a second communications module, requesting a retransmission of the digital instruction instance, and receiving the retransmitted digital instruction instance at the second communications module. These modules in the described embodiments include a first communications module, a second communications module, an ownership module, and a request module.

The first communications module receives a digital instruction instance over a communications medium. The communications medium may be a digital bus, a digital serial communications channel, an optical channel, a wireless channel, or the like. The first communications module has ownership of the communications medium. In addition, the first communications module shares the communications medium and a common identity with the second communications module. The common identity may be a common address on the communications medium.

The ownership module transfers ownership of the communications medium from the first communications module to the second communications module. In one embodiment, the ownership module directs the first communications module to relinquish ownership of the communications medium and directs the second communications module to assume ownership of the communications medium.

The request module requests a retransmission of the digital instruction instance. In one embodiment, the retransmission request is configured as a notification of transmission error. The second communications module may receive the retransmitted digital instruction instance in response to the retransmission request.

In one embodiment, the apparatus includes a notification module. The notification module may transmit a notification that the digital instruction instance transmission is complete. The apparatus receives digital instructions at multiple communications modules that share a common identity, allowing redundant devices to receive the digital instructions.

A system of the present invention is also presented to receive digital instructions. The system may be embodied in a blade center and blade. In particular, the system, in one embodiment, includes a first and second memory, a communications medium, a first and second controller, a service module, an ownership module, a request module, and a notification module.

The first and second controllers communicate with the service module over the communications medium. In one embodiment, the first and second controllers perform redundant functions. For example, the first and second controllers may manage the blade in the blade center. The first controller has ownership of the communications medium wherein only the first controller of the first and second controller communicates with the communications medium. The first and second controllers share a common address on the communications medium. The first memory stores a firmware instance for the first controller and the second memory stores the firmware instance for the second controller.

The service module may transmit a firmware instance to the first controller. The first controller stores the firmware instance in the first memory. The ownership module transfers ownership of the communications medium from the first controller to the second controller in response to the first controller successfully receiving the firmware instance. The request module requests a retransmission of the firmware instance. The service module retransmits the firmware instance to the second controller. The second controller receives the retransmitted firmware instance over the communications medium and stores the firmware instance in the second memory.

The notification module transmits a notification to the service module that the retransmitted firmware instance transmission is complete. The system receives the firmware instance from the service module at a plurality of controllers sharing a common address and notifies that the firmware instance transmission is complete.

A method of the present invention is also presented for receiving digital instructions. The method in the disclosed embodiments substantially includes the steps to carry out the functions presented above with respect to the operation of the described apparatus and system. In one embodiment, the method includes receiving a digital instruction instance over a communications medium at a first controller, transferring ownership of the communications medium to a second controller, requesting a retransmission of the digital instruction instance, and receiving the retransmitted digital instruction instance at the second controller.

A first controller receives a digital instruction instance over a communications medium. The first controller has ownership of the communications medium and shares the communications medium and a common identity with a second controller. An ownership module transfers ownership of the communications medium from the first controller to the second controller in response to successfully receiving the digital instruction instance.

The request module requests a retransmission of the digital instruction instance. The second controller receives the retransmitted digital instruction instance in response to the retransmission request. The method receives the digital instruction instance at two or more controllers sharing a common identity such as a common address.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention receives digital instructions at multiple devices or controllers that share a common identity. In addition, the embodiment of the present invention may notify that the digital instruction transmission is complete. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
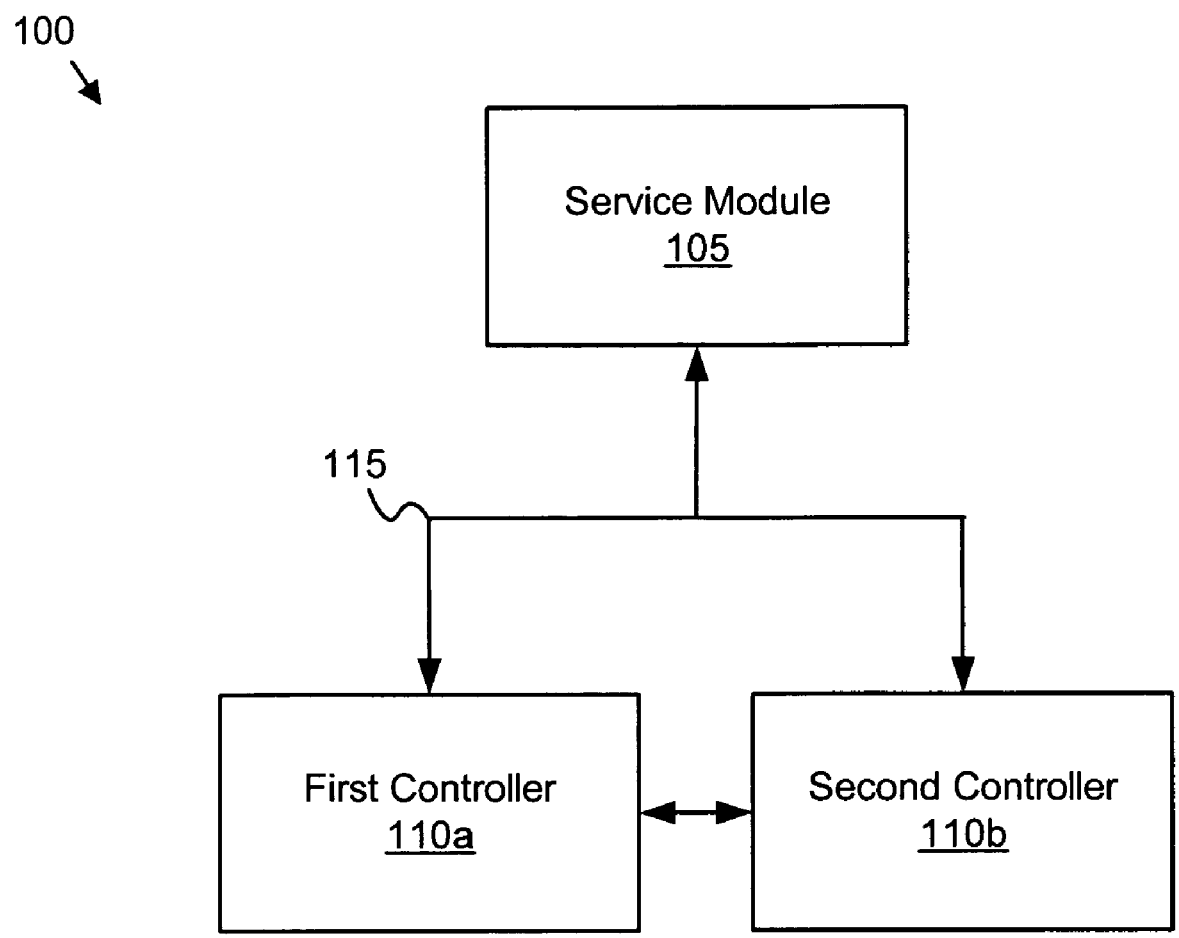
FIG. 1 is a schematic block diagram illustrating one embodiment of a receiving system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing a program of machine-readable instructions on a digital processing apparatus memory device. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a receiving system 100 in accordance with the present invention. The system 100 includes a service module 105 and one or more controllers 110. Although for simplicity the system 100 is depicted with one service module 105 and two controllers 110, any number of service modules 105 and controllers 110 may be employed.

The first and second controllers 110a, 110b may communicate with the service module 105 over a communications medium 115. The communications medium 115 may be an electronic digital bus, an electronic serial bus, a token ring bus, an optical communications medium, or the like. The service module 105 may transmit a digital instruction instance to the first and second controllers 110a, 110b.

In one embodiment, the service module 105 transmits the digital instruction instance each time each controller 110 powers up, reboots, or otherwise begins operation from an initial state. The first and second controller 110a, 110b may store the digital instruction instance in an internal memory wherein the first and second controller 110a, 110b each embody a separate internal memory. The internal memory may be volatile and require that the digital instruction instance be transmitted by the service module 105 and received by each controller module 110a, 110b each time the controllers 110 begin operation.

In an alternate embodiment, the internal memory is non-volatile. The service module 105 may periodically transmit an updated digital instruction instance to each controller 110a, 110b. The first and second controller 110a, 110b may store the updated digital instruction instance in each internal memory.

The controllers 110 may perform one or more functions such as communications functions, maintenance functions, management functions, and the like. In one embodiment, the controllers 110 perform redundant functions. For example, the second controller 110b may perform each function performed by the first controller 110a.

The first and second controllers 110a, 110b share a common identity on the communications medium 115. For example, the first and second controller 110a, 110b may each share a common address on an electronic digital bus. The first and second controller 110a, 110b may also share a common node identifier on a token ring bus. Sharing the common identity allows the first and second controller to perform completely redundant functions. Thus if the first controller 110a performs a function wherein the first controller receives a communication at a specified address, the second controller 110b may also perform the function and receive the communication at the specified address.

Unfortunately, because the first and second controller 110a, 110b share a common identity on the communications medium 115, in the past, the service module 105 has been unable to transmit a digital instruction instance to the first controller 110a and verify that the first controller 110a received the digital instruction instance, and to transmit the digital instruction instance to the second controller 110b and verify that the second controller 110b received the digital instruction instance. The embodiment of the present invention supports receiving the digital instruction instance at the first controller 110a and the second controller 110b and confirming that the digital instruction instance is successfully received.

Figure 2:
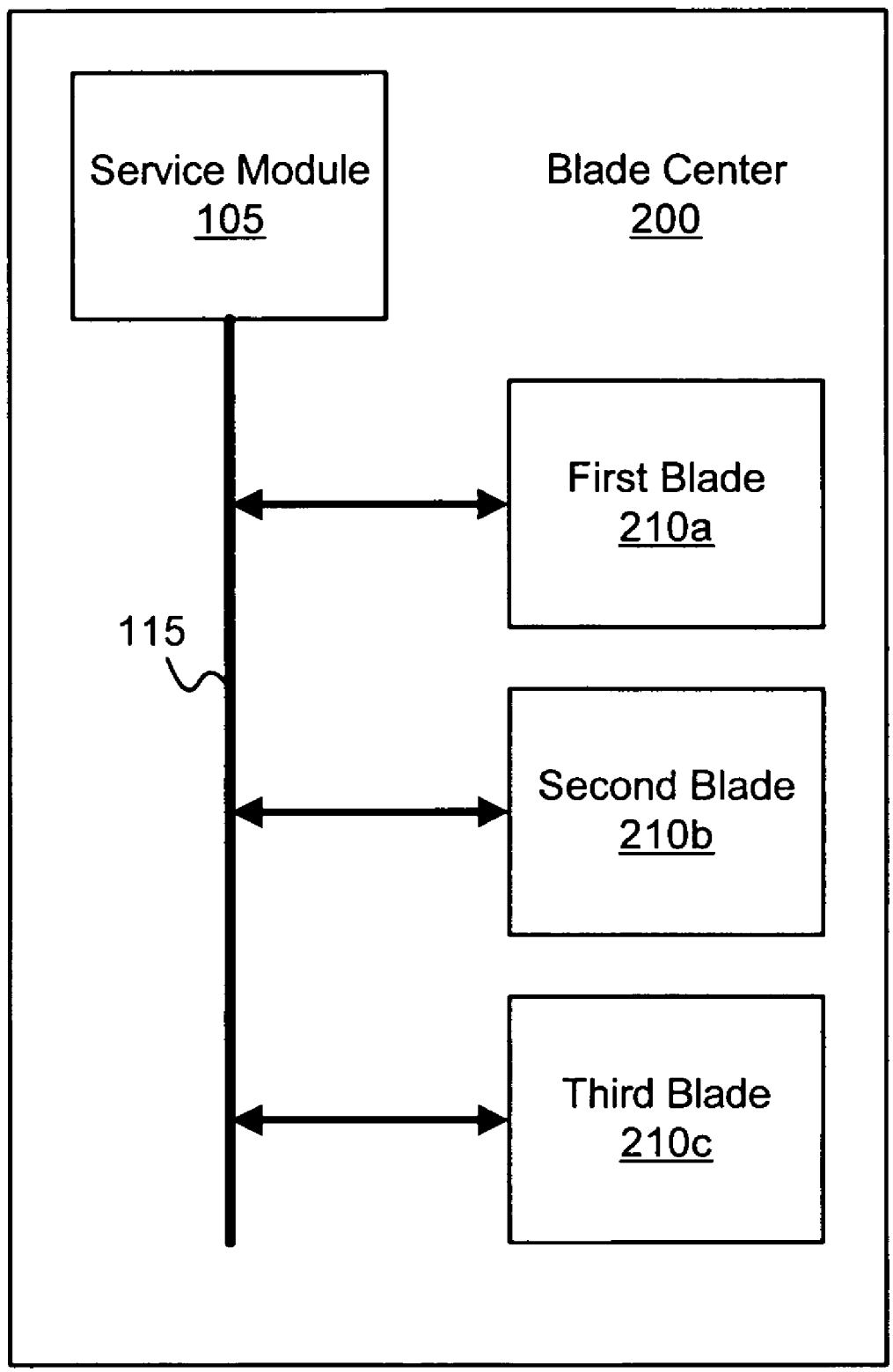
FIG. 2 is a schematic block diagram illustrating one embodiment of a blade center in accordance with the present invention.

FIG. 2 is a schematic block diagram illustrating one embodiment of a blade center 200 in accordance with the present invention. The blade center 200 includes a service module 105 that may be the service module of FIG. 1. In addition, the blade center 200 includes one or more blades 210. Each blade 210 communicates with the service module 105 over a communications medium 115 that may be the communications medium of FIG. 1. In one embodiment, the communications medium is an RS 485 bus. Although the blade center 200 is depicted with one service module 105, one communications medium 115, and three blades 210, any number of service modules 105, communications medium 115, and blades 210 may be employed.

Each blade 210 may be configured as a server, a storage device, a communication device, or the like. For example, the first blade 210a may be a server blade and comprise one or more processor modules and one or more memory modules functioning as a server as is well known to those skilled in the art. The service module 105 may assign one or more tasks to the first blade 210a over the communications medium 115. For example, the service module 105 may communicate a finite element analysis task to the first blade 210a, transmitting instructions and data over the communications medium 115. The first blade 210a may receive the instructions and data, perform calculations on the data in accordance with the instructions, and return the result of the calculations to the service module 105.

In an alternate embodiment, the service module 105 may assign the first blade 210a to communicate with and perform computations for a remote client. The service module 105 may communicate a logical path for the client to the first blade 210a and direct the first blade 210a to perform computations for the client over the communications medium 115.

Each blade 210 may embody a first and second controller 110a, 110b such as the first and second controller 110a, 110b of FIG. 1. The first and second controller 110a, 110b may redundantly perform one or more functions for the blade 210. For example, the first controller 110a may perform maintenance functions for the blade 210 and communicate with the service module 105 for the blade 210. The second controller 110b may perform no functions unless the first controller 110a fails. If the first controller 110a fails, the second controller 110b may redundantly perform the functions of the first controller 110a.

The redundancy of the first and second controllers 110a, 110b eliminates single-point controller 110 failures for the blade 210. As described for FIG. 1, each controller 110 must also receive a digital instruction instance from the service module 105, either at a commencement of operations or during a digital instruction instance update. In addition, the first and second controllers 110a, 110b share a common identity such as a common address on the communications medium 115. The digital instruction instance may be a firmware instance. The digital instruction instance must be successful transmitted to both the first controller 110a and the second controller 110b for the first and second controllers 110a, 110b to perform redundant operations for the blade 210 embodying the controllers 110.

Figure 3:
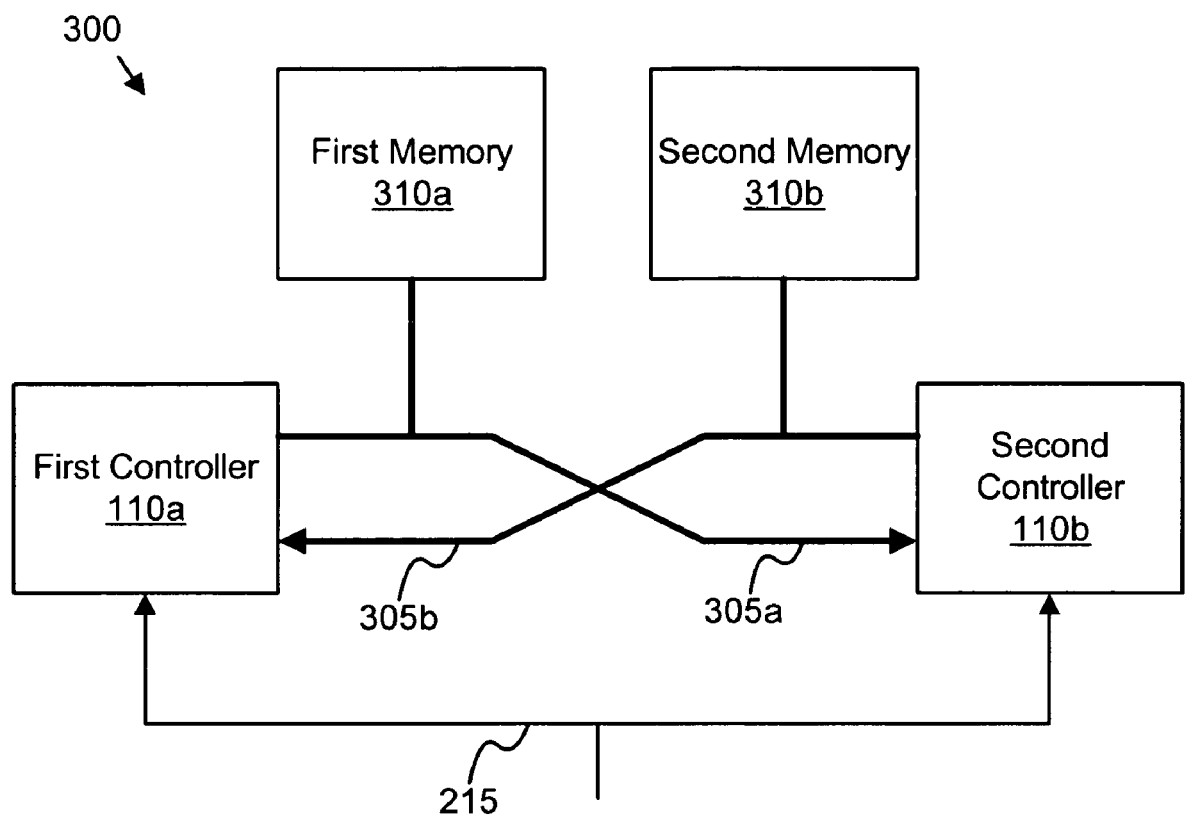
FIG. 3 is a schematic block diagram illustrating one embodiment of redundant controllers in accordance with the present invention.

FIG. 3 is a schematic block diagram illustrating one embodiment of redundant controllers 300 in accordance with the present invention. The controllers 300 include the first and second controllers 110a, 110b of FIG. 1 and may be embodied by a blade 210 of FIG. 2.

The first and second controller 110a, 110b are in communication over a first and second communications channel 305a, 305b. Each communications channel 305a, 305b may be an electronic digital bus, an electronic serial bus, or the like. In one embodiment each communications channel 305a, 305b is an I2C bus as is well known to those skilled in the art. In one embodiment, the first controller 110a is master of the first communications channel 305a and slave of the second communications channel 305b while the second controller 110b is master of the second communications channel 305b and slave of the first communications channel 305a.

The first and second controller 110a, 110b receive a digital instruction instance over a communication bus 215. The communication bus 215 is the communications medium 115 of FIG. 1-2. The first controller 110a stores the digital instruction instance in the first memory 310a, communicating the digital instruction instance over the first communications channel 305a to the first memory 310a. The second controller 110b stores the digital instruction instance in the second memory 310b, communicating the digital instruction instance over the second communications channel 305b to the second memory 310b. The first and second memories 310a, 310b may be volatile. Alternatively, the first and second memories 310a, 310b may be non-volatile.

Figure 4:
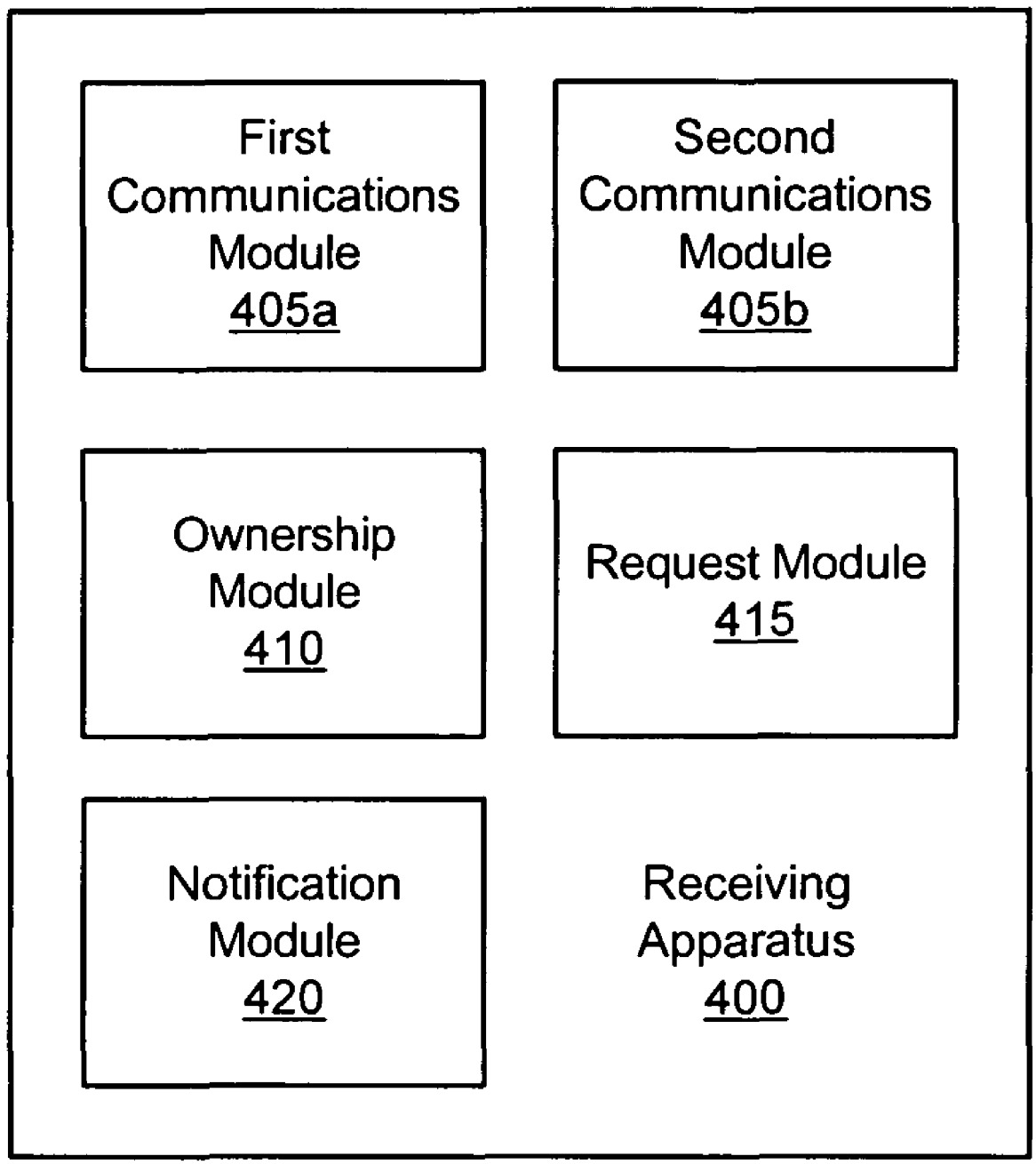
FIG. 4 is a schematic block diagram illustrating one embodiment of a receiving apparatus of the present invention.

FIG. 4 is a schematic block diagram illustrating one embodiment of a receiving apparatus 400 of the present invention. The receiving apparatus 400 may be embodied in the first and second controllers 110a, 110b of FIGS. 1 and 3. In addition, the description of FIG. 4 may refer to elements of FIGS. 1-3, like numbers referring to like elements. The apparatus 400 includes a first communications module 405a, second communications module 405b, ownership module 410, request module 415, and notification module 420.

The first and second communications modules 405a, 405b are in communication with a communications medium 115. The first and second communications modules 405a, 405b share a common identity on the communications medium 115. For example, the first and second communications modules 405a, 405b may share a common address or node identifier.

In one embodiment, the first communications module 405a is embodied in the first controller 110a of FIGS. 1 and 3. For example, the first communications module 405a may include the interface to the communications medium 115 of the first controller 110a. The second communications module 405b may be embodied in the second controller 110b of FIGS. 1 and 3 and may include in the interface to the communications medium 115 of the second controller 110b.

The first communications module 405a receives a digital instruction instance over the communications medium 115. The first communications module 405a has ownership of the communications medium 115. Thus, although both the first and second communications module 405a, 405b are both capable of communication with the communications medium 115, only the first communications module 405a is in actual communication with the communications medium 115. For example, of the first and second communications module 405a, 405b, only the first communications module 405a may receive and transmit communications over the communications medium 115 unless ownership is transferred to the second communications module 405b.

In one embodiment, the first communications module 405a restarts a first and second controller 110a, 110b if the digital instance is not successfully received. In addition, the first communications module 405b may execute a failover process in response to the transmission failure. The failover process may prepare the first and second controller 110a, 110b to receive the digital instruction instance.

The ownership module 410 transfers ownership of the communications medium 115 from the first communications module 405a to the second communications module 405. The ownership module 410 may transfer ownership in response to the first communications module 405a successfully receiving the digital instruction instance. In one embodiment, the ownership module 410 directs the first communications module 405a to relinquish ownership of the communications medium 115 and directs the second communications module 405b to assume ownership of the communications medium 115.

The request module 415 requests a retransmission of the digital instruction instance. In one embodiment, the retransmission request is configured as a notification of transmission error. The request module 415 may communicate the request for retransmission to the service module 105 of FIGS. 1 and 2. The service module 105 may receive the retransmission request and retransmit the digital instruction instance. In one embodiment, the service module 105 believes the first transmission to the common identity of the first and second communications modules 405a, 405b failed, requiring the retransmission.

The second communications module 405b as owner of the communications medium 115 may receive the retransmitted digital instruction instance. In one embodiment, the second communications module 405b restarts the first and second controller 110a, 110b if the digital instance is not successfully received. In addition, the second communications module 405b may execute a failover process in response to the transmission failure.

The notification module 420 may transmit a notification that the digital instruction instance transmission is complete. In one embodiment, the notification module 420 transmits the notification in response to the second communications module 405b successfully receiving the digital instruction instance. The apparatus 400 receives the digital instructions at multiple communications modules 405 that share a common identity, allowing redundant devices such as redundant controllers 110 to receive the digital instructions.

Figure 5:
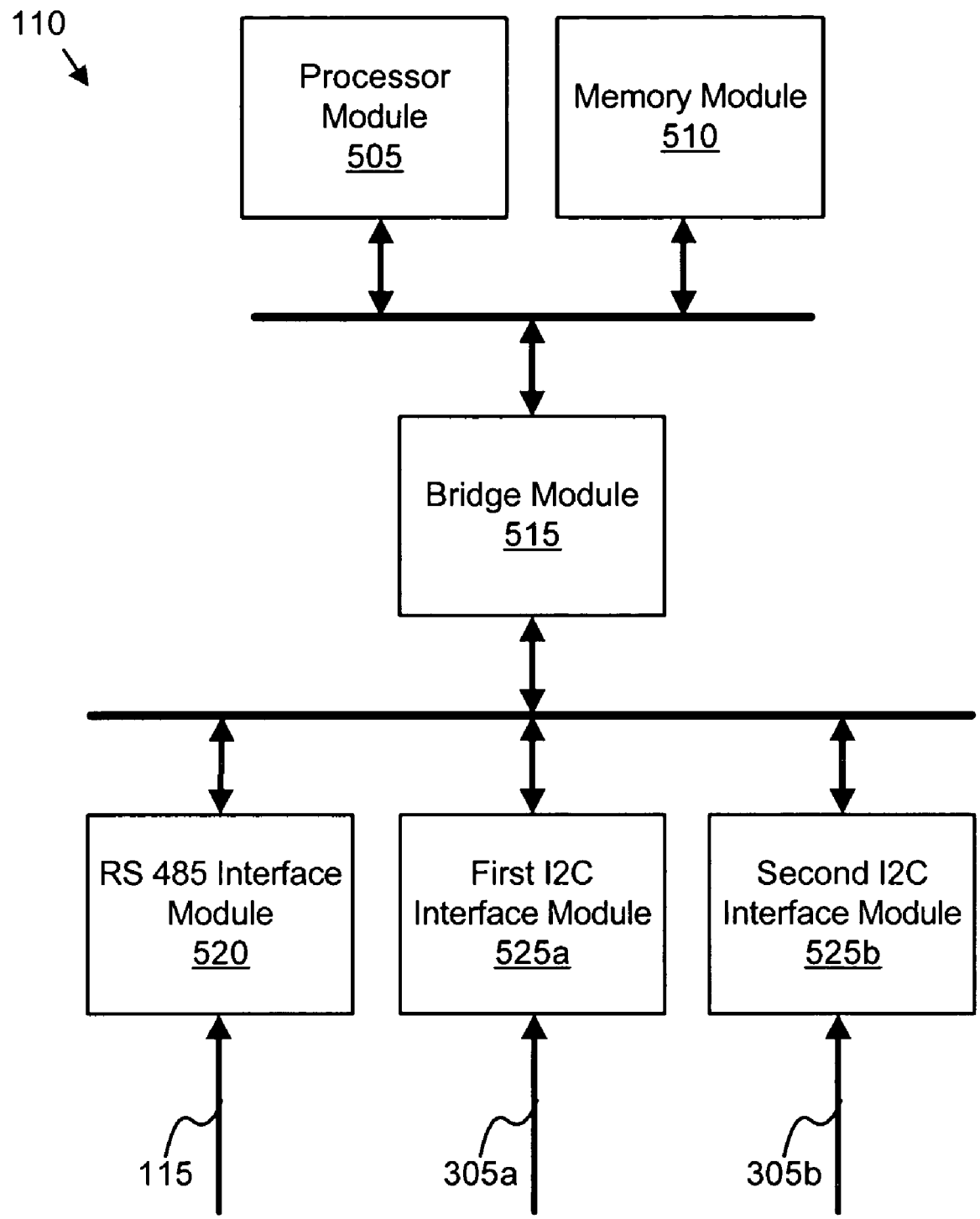
FIG. 5 is a schematic block diagram illustrating one embodiment of a controller in accordance with the present invention.

FIG. 5 is a schematic block diagram illustrating one embodiment of a controller 110 in accordance with the present invention. The controller 110 may be the controller 110 of FIGS. 1 and 3. The description of the controller 110 may refer to one or more elements of FIGS. 1-4, like numbers referring to like elements. The controller 110 includes a processor module 505, a memory module 510, a bridge module 515, an RS 485 interface module 520, a first I2C interface module 525a, and a second I2C interface module 525b.

The processor module 505, memory module 510, bridge module 515, RS 485 interface module 520, first I2C interface module 525a, and second I2C interface module 525b may be fabricated of semiconductor gates on one or more semiconductor substrates. Each semiconductor substrate may be packaged in one or more semiconductor devices mounted on circuit cards. Connections between the processor module 505, the memory module 510, the bridge module 515, the RS 485 interface module 520, the first I2C interface module 525a, and the second I2C interface module 525b may be through semiconductor metal layers, substrate to substrate wiring, or circuit card traces or wires connecting the semiconductor devices.

The memory module 510 stores software instructions and data. The processor module 505 executes the software instructions and manipulates the data as is well know to those skilled in the art. The processor module 505 communicates with the RS 485 interface module 520, the first I2C interface module 525a, and the second I2C interface module 525b through the bridge module 515.

In one embodiment, the RS 485 interface module 520 may embody a communications module 405 such as the first or second communications modules 405a, 405b of FIG. 4. The RS 485 interface module 520 may have ownership of communications with the communications bus 115 which may be configured as an RS 485 bus. In addition, the first I2C interface module 525a may communicate with the first communications channel 305a and the first I2C interface module 525b may communicate with the second communications channel 305b of FIG. 3. The first and second communications channels 305a, 305b may be configured as I2C buses.

In one embodiment, the memory module 510 stores and the processor module 505 executes one or more software processes that embody all or portions of the first communications module 405a, second communications module 405b, ownership module 410, request module 415, and notification module 420 of FIG. 4.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
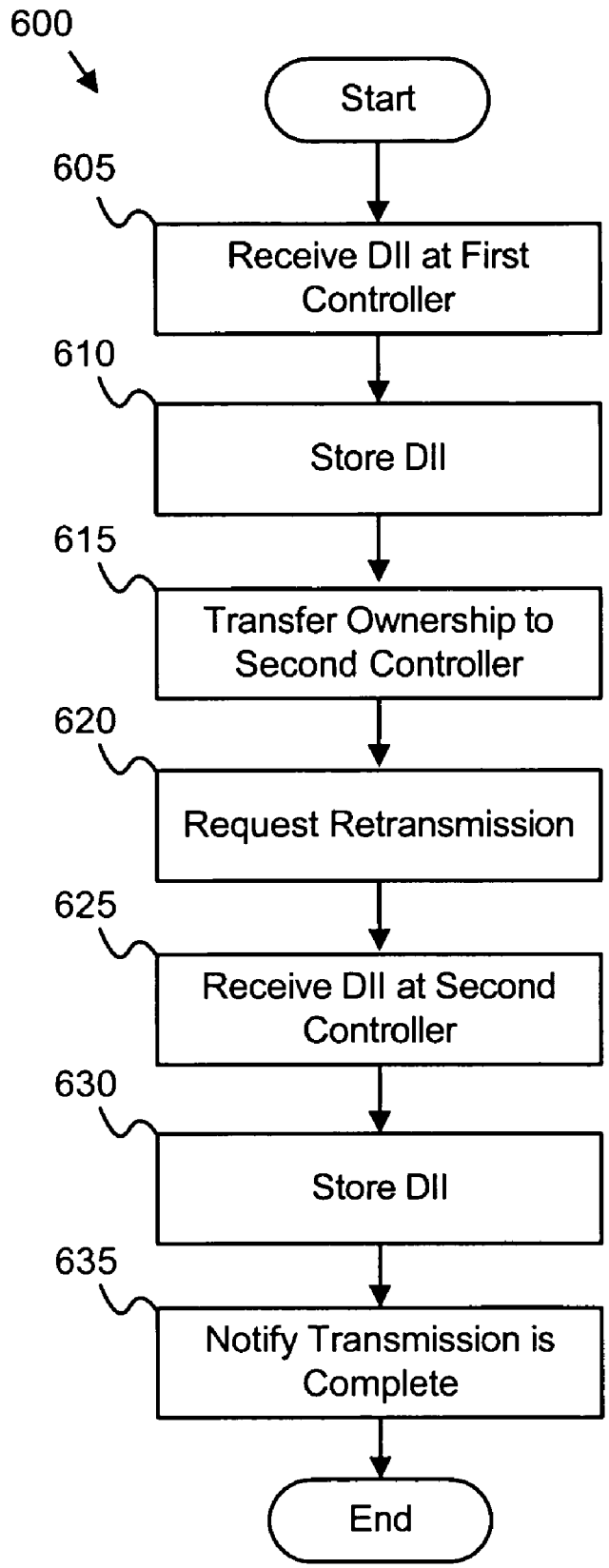
FIG. 6 is a schematic flow chart diagram illustrating one embodiment of a receiving method of the present invention.

FIG. 6 is a schematic flow chart diagram illustrating one embodiment of a receiving method 600 of the present invention. The method 600 substantially includes the steps to carry out the functions presented above with respect to the operation of the described apparatus 300, 400, 500 and system 100, 200 of FIGS. 1-5. The method 600 also refers to elements of FIGS. 1-5, like numbers referring to like elements.

A first controller 110a receives 605 a digital instruction instance over a communications medium 115. A service module 105 may transmit the digital instruction instance. The digital instruction instance may be a firmware instance. The first controller 110a has ownership of the communications medium 115 and shares the communications medium 115 and a common identity with a second controller 110b. The service module 105 may be unable to distinguish between the first and second controller 110a, 110b. In one embodiment, the common identity of the first and second controller is a common address on the communications medium 115.

In one embodiment, the first controller 110a stores 610 the received digital instruction instance. The first controller 110a may store 610 the digital instruction instance in a first memory 310a by communicating the digital instruction instance over a first communications channel 305a to the first memory 310a.

An ownership module 410 transfers 615 ownership of the communications medium 115 from the first controller 110a to the second controller 110b. In one embodiment, the ownership module 410 transfers 615 the ownership in response to the first controller 110a successfully receiving the digital instruction instance. For example, if the first controller 110a receives 605 and stores 610 each byte of a data transmission of a specified length, the ownership module 410 may transfer 615 ownership of the communications medium 115. The first controller 110a may embody the ownership module 410.

In one embodiment, only the first or second controller 110a, 110b may receive and transmit communications over the communications medium 115 using the common identity. For example, only either the first or second controller 110a, 110b with ownership of the communications medium 115 may receive data directed to the common identity over the communications medium 115 and assert control over the communications medium 115 to transmit data over the communications medium 115.

A request module 415 requests 620 a retransmission of the digital instruction instance. In one embodiment, the request module 415 requests 620 the retransmission in response to the transfer 615 of ownership of the communications medium 115 to the second controller 110b. The second controller 110b may embody the request module 415 and the request module 415 may request the retransmission in response to the ownership module 410 directing the second controller 110b to assume ownership of the communications medium 115. In one embodiment, the request module 415 requests 620 the retransmission by transmitting a notification of transmission error. The request module 415 may transmit the notification of transmission error to the service module 105. The service module 105 may believe that the digital instruction instance transmission was unsuccessful and so retransmit the digital instruction instance.

The second controller 110b receives 625 the retransmitted digital instruction instance in response to the retransmission request. In one embodiment, the second controller 110b stores 630 the received digital instruction instance. The second controller 110b may store 630 the digital instruction instance in a second memory 310b by communicating the digital instruction instance over a second communications channel 305b to the second memory 310b.

In one embodiment, a notification module 420 notifies 635 the service module 105 that the digital instruction instance transmission is complete and the method 600 terminates. For example, if the second controller 110b receives 625 and stores 630 each byte of a data transmission of a specified length, the notification module 420 may notify 635 the service module 105 that the digital instance transmission is complete. The service module 105 may believe that one transmission of the digital instruction is successful, although the notification module 420 only notifies 635 the service module 105 when the digital instruction instance is successfully received by each controller 110.

In one embodiment, the method 600 receives the digital instruction instance at three or more controllers 110. For example, if the method 600 received the digital instruction instance at five controllers, the first four controllers 110 may include an ownership module 410 and transfer 615 ownership to a subsequent controller 110 upon successfully receiving 605 and storing 610 the digital instruction instance. The second through fifth controllers 110 may include the request module 415 and request 620 retransmission in response to being directed to assume ownership of the communications medium 115.

The fifth controller 110 may include the notification module 420 and may notify 635 the service module 105 that the transmission is complete in response to the fifth controller receiving 625 and storing 630 the digital instruction instance. The method 600 receives the digital instruction instance at a plurality of controllers 110 sharing a common identity. A transmitting device such as the service controller 105 may only be aware of a single controller 110 using the common identity although the transmission is only complete when each controller 110 receives the digital instruction instance.

Figure 7:
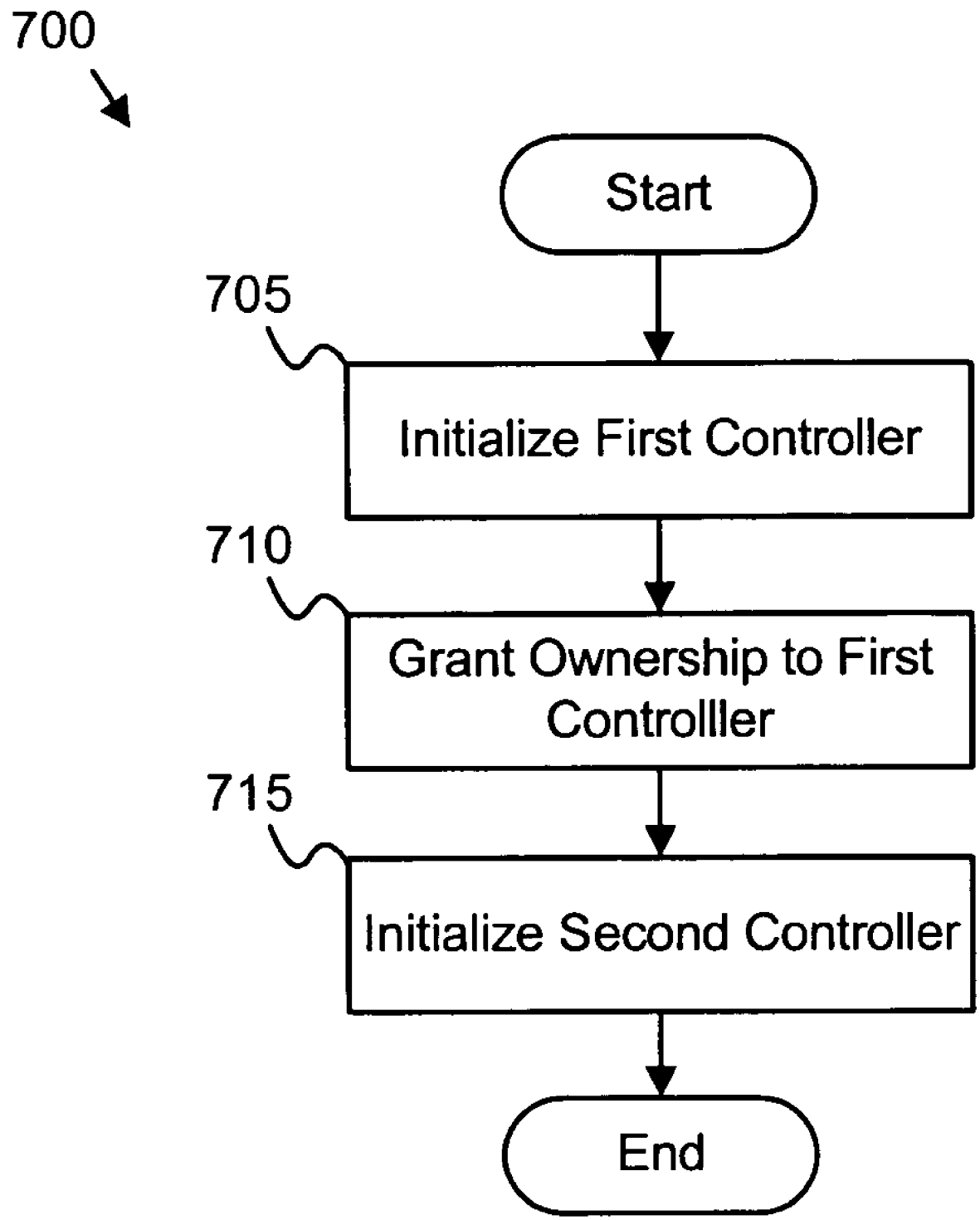
FIG. 7 is a schematic flow chart diagram illustrating one embodiment of an initialization method of the present invention.

FIG. 7 is a schematic flow chart diagram illustrating one embodiment of an initialization method 700 of the present invention. The method 700 substantially includes the steps supporting the functions presented above with respect to the operation of the described method 600, apparatus 300, 400, 500 and system 100, 200 of FIGS. 1-6. The method 700 also refers to elements of FIGS. 1-6, like numbers referring to like elements.

The method 700 begins and in one embodiment, a first controller 110a is initialized 705. The first controller 110a may self-initialize 705 from an internal memory. For example, the first controller 110a may be configured to execute one or more software processes beginning at a specified internal memory location or a non-volatile memory device in communication with the first controller 110a as is well known to those skilled in the art.

In one embodiment, an initialization software process grants 710 ownership of a communications medium 115 to the first controller 110a. The initialization software process may further load a first communications module 405a and an ownership module 410 to the first controller 110a.

In one embodiment, the second controller 110b is initialized 715 and the method 700 terminates. The second controller 110b may be initialized 715 by an internal memory or a non-volatile memory device in communication with the second controller 110b. The second controller 110b may be configured to execute one or more software processes from the internal memory to initialize the second controller 110b. In one embodiment, an initialization software process may load a second communications module 405a, a request module 415, and a notification module to the second controller 110b. The method 700 may prepare the first and second controller 110a, 110b to receive the transmission of the digital instruction instance described in method 600 of FIG. 6.

The embodiment of the present invention receives instructions at multiple devices or controllers 110 that share a common identity. In addition, the embodiment of the present invention may notify 635 that the digital instruction transmission is complete.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to receive digital instructions, the apparatus comprising:
    a first communications module configured to receive a digital instruction instance over a communications medium, wherein the first communications module has ownership of the communications medium and shares the communications medium and a common identity with a second communications module, wherein the common identity is a single shared address on the communications medium and the first communications module is responsive to the single shared address on the communications medium;
    an ownership module configured to transfer ownership of the communications medium from the first communications module to the second communications module such that the second communications module is responsive to the single shared address on the communications medium;
    a request module configured to request a retransmission of the digital instruction instance; and
    the second communications module configured to receive the retransmitted digital instruction instance over the communications medium.

2. The apparatus of claim 1, further comprising a notification module configured to transmit a notification that the digital instruction instance transmission is complete.

3. The apparatus of claim 1, wherein the request for retransmission is configured as a notification of a transmission error.

4. The apparatus of claim 1, wherein the first and second communications modules are further configured to store the digital instruction instance as the digital instruction instance is received by each communications module.

5. The apparatus of claim 1, wherein the digital instruction instance is configured as firmware instance.

6. A computer readable storage medium tangibly embodying a program of machine-readable instructions executable by a digital processing apparatus to perform an operation to receive digital instructions, the operation comprising:
    receiving a digital instruction instance over a communications medium at a first controller, wherein the first controller has ownership of the communications medium and shares the communications medium and a common identity with a second controller, wherein the common identity is a single shared address on the communications medium and the first controller is responsive to the single shared address on the communications medium;
    transferring ownership of the communications medium from the first controller to the second controller in response to the first controller successfully receiving the firmware instance such that the second controller is responsive to the single shared address on the communications medium;

requesting a retransmission of the digital instruction instance; and receiving the retransmitted digital instruction instance over the communications medium at the second controller.

7. The computer readable storage medium of claim 6, wherein the instructions further comprise an operation to notify that the digital instruction instance transmission is complete.

8. The computer readable storage medium of claim 6, wherein the request for retransmission is configured as a notification of a transmission error.

9. The computer readable storage medium of claim 6, wherein the instructions further comprise an operation to store the digital instruction instance for each controller as the digital instruction instance is received by each controller.

10. The computer readable storage medium of claim 6, wherein the digital instruction instance is stored in a volatile memory.

11. The computer readable storage medium of claim 6, wherein the digital instruction instance is configured as a firmware instance.

12. A system to receive firmware, the system comprising:
a first memory configured to store digital data;
a second memory configured to store digital data;
a communications medium configured to communicate digital data;
a service module configured to transmit a firmware instance over the communications medium;
a first controller configured to receive the firmware instance over the communications medium and store the firmware instance in the first memory, wherein the first communications module has ownership of the communications medium and shares the communications medium and a common address on the communications medium with a second controller, wherein the common address is a single shared address on the communications medium and the first controller is responsive to the single shared address on the communications medium;
an ownership module configured to transfer ownership of the communications medium from the first controller to the second controller in response to the first controller successfully receiving the firmware instance such that the second controller is responsive to the single shared address on the communications medium;
a request module configured to request a retransmission of the firmware instance by the service module;
the second controller configured to receive the retransmitted firmware instance over the communications medium and store the retransmitted firmware instance in the second memory; and
a notification module configured to transmit a notification to the service module that the firmware instance transmission is complete.

13. The system of claim 12, further comprising a blade center comprising the service module.

14. The system of claim 13, wherein the service module is only in communication with either the first controller or the second controller.

15. The system of claim 14, wherein the first and second memory, the first and second controller, the ownership module, the request module, and the notification module are embodied in a blade, wherein the blade is operatively connected to the blade center.

16. The system of claim 15, wherein the request for retransmission is configured as a notification of a transmission error.

17. The system of claim 16, wherein the first and second memory are volatile memories.

18. A method for deploying computer infrastructure, comprising integrating computer-readable code into a computing system, wherein the code in combination with the computing system is capable of performing the following:

receiving a firmware instance over a communications medium at a first controller, wherein the first controller has ownership of the communications medium and shares the communications medium and a common address with a second controller, wherein the common address is a single shared address on the communications medium and the first controller is responsive to the single shared address on the communications medium;

transferring ownership of the communications medium from the first controller to the second controller in response to the first controller successfully receiving the firmware instance such that the second controller is responsive to the single shared address on the communications medium;

requesting a retransmission of the firmware instance wherein the request is configured as a notification of transmission error;

receiving the retransmitted firmware instance over the communications medium at the second controller; and notifying that the digital instruction instance transmission is complete.

* * * * *